United States Patent [19]

Jain et al.

[11] Patent Number: 5,428,611
[45] Date of Patent: Jun. 27, 1995

[54] STRONG FRAMING PROTOCOL FOR HDLC AND OTHER RUN-LENGTH CODES

[75] Inventors: Rajendra K. Jain, Sudbury, Mass.; Richard L. Szmauz, New Ipswich, N.H.

[73] Assignee: Digital Equipment Corporation, Maynard, Mass.

[21] Appl. No.: 69,314

[22] Filed: May 28, 1993

[51] Int. Cl.⁶ .............................................. H04J 3/07
[52] U.S. Cl. .................................. 370/79; 370/82; 370/99; 370/102
[58] Field of Search ................. 370/60, 79, 82, 83, 370/94.1, 99, 102, 110.1; 371/55, 57.1, 57.2; 375/25, 34, 94

[56] References Cited

U.S. PATENT DOCUMENTS

| | | |
|---|---|---|
| 3,624,637 | 11/1971 | Irwin . |
| 4,261,035 | 4/1981 | Raymond ........................... 364/200 |
| 4,327,379 | 4/1982 | Kadikia et al. ...................... 358/261 |
| 4,346,440 | 8/1982 | Kyu et al. ........................... 364/200 |
| 4,387,364 | 6/1983 | Shirota ......................... 340/347 DD |
| 4,488,143 | 12/1984 | Martin .......................... 340/347 DD |
| 4,779,072 | 10/1988 | Van Gestel ........................ 341/59 |
| 4,811,361 | 3/1989 | Bacou et al. ....................... 375/25 |
| 4,833,470 | 5/1989 | Iketani ................................ 341/59 |
| 4,851,837 | 7/1989 | Baldwin ............................. 341/55 |
| 4,937,573 | 6/1990 | Silvio et al. ......................... 341/67 |
| 4,993,023 | 2/1991 | Phinney ......................... 370/85.13 |
| 5,007,045 | 4/1991 | Tsuzuki ............................ 370/94.1 |
| 5,060,242 | 10/1991 | Arbeiter ............................ 375/122 |
| 5,065,053 | 11/1991 | Chan et al. ........................ 307/492 |
| 5,099,500 | 3/1992 | Furlong ............................. 375/94 |
| 5,121,085 | 6/1992 | Brown ................................ 331/8 |

*Primary Examiner*—Melvin Marcelo
*Attorney, Agent, or Firm*—A. Sydney Johnston; J. Bradford Leaheey

[57] ABSTRACT

Ideal for use in high-speed wide-area networks, such as HDLC as defined in ISO Standard 3309, a strong framing method for data packets significantly improves undetected error probability. In a run-length code type data communication scheme, wherein frame delimiter strings, abort strings and idle strings, are transmitted as control symbols, the method includes providing the frame delimiter string as a multi-symbol construct for delimiting the transmitted data, providing the abort strings and idle strings to respectively include minimum run lengths which are substantially longer than the individual symbols in the multi-symbol construct, transmitting data with control symbols as a bit sequence, and receiving and analyzing the transmitted data at the data-receiving device to detect the presence of bit errors.

17 Claims, 5 Drawing Sheets

STRONG FRAMING PROTOCOL FOR HDLC AND OTHER RUN-LENGTH CODES

FIELD OF THE INVENTION

The present invention relates generally to bit oriented data link protocols used in the transmission of information in high-speed wide-area networks and, more particularly, to data transmission reliability and enhanced framing techniques for High Level Data Control ("HDLC" as defined, for example, in ISO Standard 3309).

BACKGROUND OF THE INVENTION

Data communications systems comprise data communications equipment and data processing equipment connected together by data transmission links. Information is transmitted over these data transmission links in a serial fashion from one device to another in the form of a stream of information which has an identifiable beginning and end. This serial stream of information contains not only data information which includes the origin and/or destination of the data and information indicating the type of data being conveyed, but also control information which includes information designating the beginning and end of the stream. Before transmission, the data information and the control information are merged together to create a frame, which consists of a data field surrounded by specially coded control symbols.

Bit-oriented data link protocols are a set of predetermined agreements governing the exchange of information. One type of bit-oriented protocol is based on a run-length code which is used to efficiently merge, and subsequently separate, the control information from the data information before and after transmission on the communications link. The run-length of ones is the number of successive ones in a bit stream without any intervening zero. Similarly, the run-length of zeroes is the number of successive zeroes in the bit stream without any intervening one. In a run-length coding scheme, special symbols with large run-length are used as control symbols. A bit stuffing technique is used to ensure that such symbols do not appear in the middle of the data field of the frame. Thus, the run length of ones and zeroes provides a way to distinguish between the control information and the data information received.

A symmetrical run-length code specifies the maximum run length of both ones and zeroes which can occur during the active state of information transmission. Since a symmetrical run-length code guarantees a minimum transition density of ones and zeroes for all data and control streams in the active state, clocking information can be encoded. Note that the limit applies only during the active state. During idle state, there is no upper limit to the run length of ones or zeroes transmitted.

HDLC is also a run-length code. However, it falls into a second class of run-length codes referred to as asymmetrical run-length codes.

Asymmetrical run-length codes are those that specify either a maximum run length of ones or a maximum run length of zeroes in the active, non-idle state. Since asymmetrical run-length codes only guarantee a maximum number of ones in a zero field, or vice versa, they cannot effectively encode clocking information. HDLC limits the number of ones in a zero field. Asymmetrical run-length codes are DC unbalanced.

In HDLC, a control symbol is placed at the beginning and the end of the data stream to indicate to the receiver when a new stream of data begins and to indicate when the stream of data ends. The data stream bounded by the control symbol is called a packet or a frame. The control symbol used to indicate the beginning of the frame is called "starting delimiter." Similarly, an "ending delimiter" is used to indicate the end of the frame. Other control symbols are used to abort frames and change line state. In HDLC, a single control symbol can serve as an ending delimiter for one frame and as a starting delimiter for another frame, and so it is more appropriately called a "frame delimiter." The frame delimiter is defined as a unique pattern of ones and zeroes comprising 01111110—a sequence of six ones preceded and followed by zeroes. The run length of ones in the frame delimiter is six. The receiver recognizes this pattern as control information and operates accordingly. The frame, however, also contains data information in the form of ones and zeroes whose pattern can be entirely arbitrary. Consequently, it is possible that the starting delimiter pattern, 01111110, could appear at any time during the transmission of data information. If the receiver recognizes this pattern as a frame field instead of the data it represents, the data transmission would be destroyed. To prevent this problem, an operation called "bit stuffing" is used.

"Bit stuffing" involves altering the original data stream by placing ("stuffing") a zero bit in the sequence of ones whenever the run length of ones exceeds five. These extra (stuffed) zero bits are removed at the receiver by observing the run length of ones. Whenever a zero follows a sequence of 5 ones, the zero is assumed to be a stuffed bit and is removed. A larger run length of ones is interpreted as a control symbol. Thus, bit stuffing allows the receiver to distinguish data information from control information. The maximum run length could have been set at any other boundary value. This boundary value has been set to five in HDLC.

While useful for delineating the control stream from the data stream, bit stuffing does not account for data errors which are capable of destroying or prematurely terminating a transmission. Consider, for instance, a data sequence including two zeroes, followed by five ones and another zero (i.e., 00111110). If this sequence experiences an error during the transmission which converts the second zero to a one (i.e., 01111110), the device receiving this transmission will recognize it as a frame delimiter control symbol, indicating that the data sequence (frame) has ended or a new data sequence has begun.

Traditional implementations use a checksum or cyclic redundancy check (CRC) to detect such errors. If the checksum that is calculated after reception of the transmitted data does not correspond to the pre-calculated checksum sent with the data, the receiving device attempts to identify and correct the erroneous bit or requests a re-transmission. Unfortunately, the effectiveness of such detection/correction algorithms depends on to the complexity and bit-length of the checksum sequence. HDLC uses a 16-bit CRC. The probability that a falsely created frame delimiter will not be detected by a HDLC CRC is $2^{-16}P$. Here, P is the probability of a bit error. Since the number of bit errors that result in undetected errors is just one, conventional HDLC framing has a Hamming distance of one. Both the probability of undetected errors and the Hamming distance of HDLC are unacceptable for many high-speed applications where billions of frames are transmitted every day. Thus, there is a need to either strengthen the CRC or use a stronger frame delimiter.

SUMMARY OF THE INVENTION

The present invention overcomes the disadvantages of the prior art by using a multi-symbol construct as the frame delimiter. The framing technique of the invention is so strong that all noise events that result in three or less bit errors can be detected. To create an undetected error, a minimum of four bits must be in error. In other words, the Hamming distance is four. This means that the probability of undetected errors is now reduced to $2^{-16}P^4$. The bit error probability P is usually $10^{-5}$ to $10^{-10}$. Thus, the present invention realizes an improvement on the order of $10^{15}$ to $10^{-30}$ over the conventional framing scheme.

Another innovative aspect of the inventive framing technique is that the transmitters and receivers using the new framing can coexist and work with those using the conventional HDLC framing technique. The frames using the inventive strong framing scheme are correctly decoded by existing HDLC receivers. This property allows a network consisting of many transmitters and receivers to be upgraded incrementally and it is not necessary to replace all of them at once.

According to a preferred embodiment of the present invention, a strong framing method is used for data packets which are transmitted as bit sequences from a data-transmitting device to a data-receiving device in a run-length code type data communication scheme. The method includes providing the frame delimiter string as a multi-symbol construct for delimiting the transmitted data, wherein the multi-symbol construct includes a plurality of individual control symbols each including at least eight-bits; providing the abort strings and idle strings to respectively include minimum run lengths which are substantially longer than the individual control symbols in the multi-symbol construct; transmitting informational data with the control symbols as a bit sequence from the data-transmitting device; receiving the transmitted data at the data-receiving device; and analyzing the received data to detect the presence of bit errors.

The above-described embodiment is merely an exemplary embodiment and is not intended to represent each of the embodiments of the present invention discussed in the specification that follows.

BRIEF DESCRIPTION OF THE DRAWINGS

Other aspects and advantages of the present invention will become apparent upon reading the following detailed description and upon reference to the drawings in which.

While the invention is susceptible to various modifications and alternative forms, specific embodiments thereof have been shown by way of example in the drawings and will be described in detail herein. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 1:
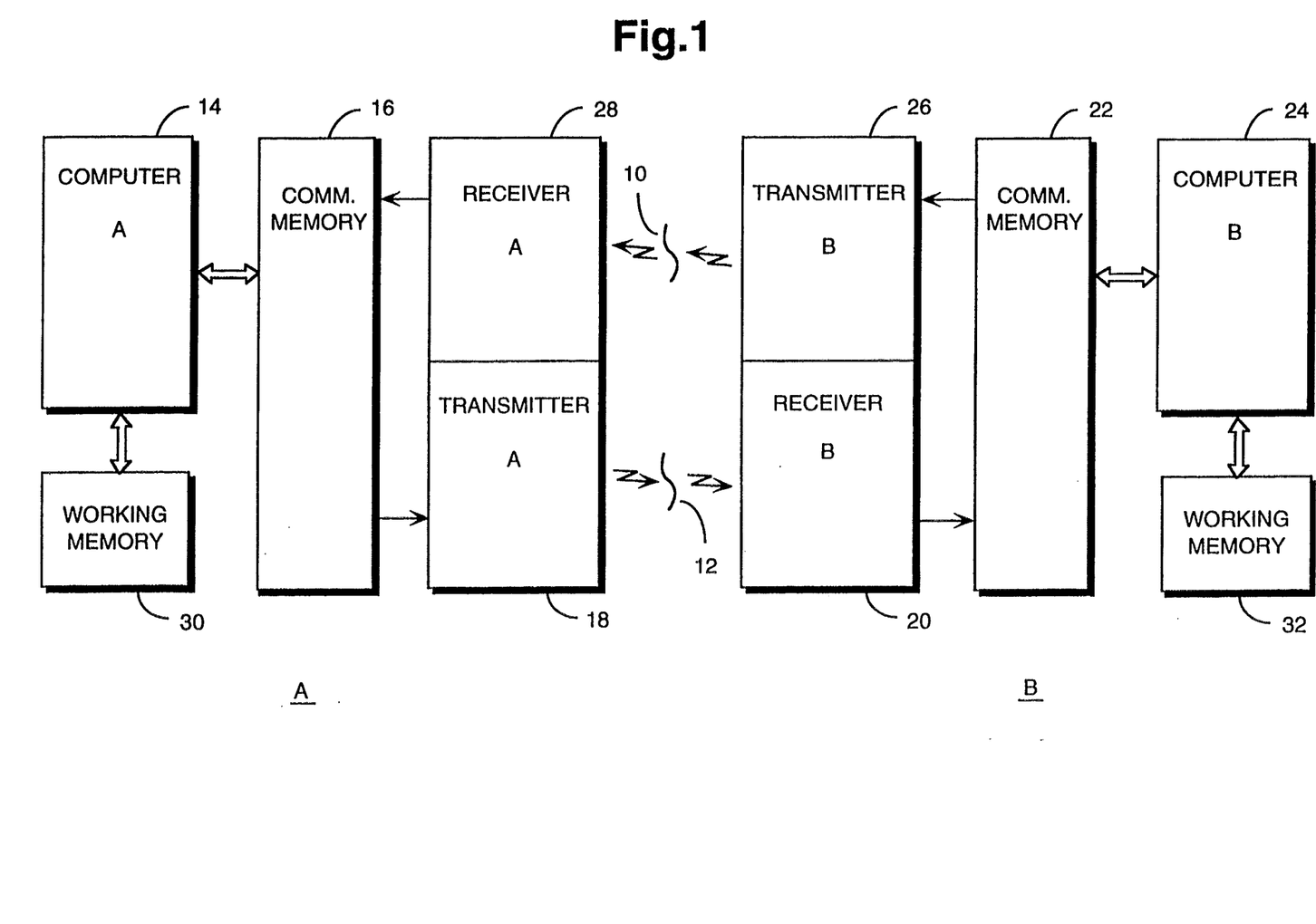
FIG. 1 is a block diagram of a system for implementing the present invention.

Turning now to FIG. 1, a preferred embodiment of the present invention is illustrated in block diagram form. FIG. 1 illustrates a two-way data communication system having two virtually identical sets of hardware, the master set which is designated as "A" and one of several slave sets which is designated as "B". The respective communication paths are designated as 10 and 12.

Under the control of a master computer 14, data at the master side is sent over the communication path 12 through a communication memory circuit 14 and a transmitter circuit 18. Under the control of a slave computer 24, data is received over the communication path 12 at a receiver circuit 20 and, via a communication memory circuit 22, is fed to the slave computer 24. Each computer 14, 24 includes conventional working memory 30, 32 for storage of operational code and short-term and long-term data storage.

Except for the software and hardware changes discussed below in connection with FIGS. 2-5, the hardware and software architecture is conventional, as may be found in existing HDLC data communication networks. See, for example, the HDLC systems illustrated and described in U.S. Ser. No. 07/845,673, by Richard L. Szmauz and Anthony Lauck (assigned to the instant assignee) and U.S. Pat. No. 5,007,045, by Tsuzuki (assigned to NEC Corporation), both of which are incorporated herein by reference. Before discussing the exemplary software and hardware particulars which may be used to implement the present invention, a general discussion of a preferred strong frame coding approach is provided below.

In accordance with the present invention, data sent over either communication path 10, 12 uses a frame delimiter which is implemented as a multi-symbol construct. For a desired Hamming Distance ("HD") of four, this delimiter is preferably implemented as a 34-bit frame delimiter instead of the single-symbol 8-bit delimiter used in conventional HDLC systems. Thus, rather than using a zero, six ones, followed by a zero (—01111110—), the beginning and end of a frame is preferably designated as:

—01111110 01111110 01111110 01111110—.

Using "F" to represent —01111110—and "$A_7$" to represent —011111110—, this multi-symbol frame delimiter may be represented as —F $A_7$ $A_7$ F—or by a single letter S. Further, by properly defining the idle string sequence to a sequence with a run length greater than the length of the frame delimiter S and by defining the abort string sequences to be substantially longer than one of the individual symbols of the multi-symbol construct, the probability of an undetected error occurring in connection with the frame delimiter is improved over conventional HDLC networks, which use sixteen-bit checksums, from $(P \times 1/65,536)$ to $(P^4 \times 1/65,536)$, where P is the probability of any error occurring in the communication link. Thus, the improvement provided with the present invention is on the order of $P^3$.

For example, consider an implementation in which only the control string defined as a zero, followed by twelve ones, followed by a zero (—0111111111110—), is allowed to be the abort string and is used to prematurely terminate a data transmission, and in which the idle string sequence is restricted to a minimum run length of 35 and is used to indicate that the link is no longer active (no data is being sent). Using this criteria, a Hamming Distance of four is realized for each control symbol (abort, idle, frame delimiter). At least four errors are required to change one symbol into another symbol as illustrated below:

| Symbol Transition | Bit-Error Examples | | |
|---|---|---|---|
| S → D | TX .. 01111110011111100111111001111110 .. | | |
| | Error   E    E    E    E | | |
| | RX .. 01111100011111010011011111001101110 .. | | |
| 1D → S | TX .. 01111100011111010011011111001101110 .. | | |
| | Error   E    E    E    E | | |
| | RX .. 01111110011111100111111001111110 .. | | |
| A → S | TX .. 0111111111100 ... Arbitrary bit stream | | |
| | EE   EE | | |
| | RX .. 01111110011111100111111001111110+ .. | | |
| A → D | TX .. 0111111111110 .. | | |
| | Error     E   E   + 2 | more errors in packet destroying d-stuff opportunities so packet stretches out by 2 bits so the A   D error adds an integral multiple of 8 bits to the packet (16 = 2 +14) | |
| | RX .. 01111011101110 .. | | |
| I → S | TX .. 0111111111111111111111111111111111+ .. | | |
| | EE    EE    EE    E | | |
| | RX .. 01111110011111100111111001111110+ .. | | |
| I → D | TX .. 0111111111111111111111111111111111+ .. | | |
| | Error   E    E    E    E | | |
| | RX .. 01110111101110111011111111111111+ .. | | |

In this illustrative table, "S" represents the above-discussed multi-symbol frame delimiter —F A7 A7 F—, D represents informational data, "A" represents the above-discussed abort control symbol, and "I" represents the idle symbol. There is an "E" below each changed bit in the far right column to show where the errors occurred to cause the symbol transition.

In conventional HDLC framing, a single zero may be shared among multiple control symbols. Thus, —0111111111110— would be considered a valid sequence and would be interpreted as a sequence of two F symbols. In the proposed invention, zero sharing is not allowed. The transmitters always send each control symbol with its own zeroes preceding and following the sequence of ones. Thus, to send two F symbols, the transmitter following the proposed invention will send 0111111001111110. The receivers will interpret —0111111101111110—as an invalid sequence and indicate an error condition.

Accordingly, the above implementation may be used to significantly improve the data integrity of data transmission, with errors being detected as shared zeroes between any of the above-referenced control symbols.

Another important aspect of the above-exemplified multi-symbol frame delimiter is the practicability of retrofitting existing systems with the present invention. Because the frame delimiter F used for conventional HDLC systems is incorporated within the above-exemplified frame delimiter S of the present invention, systems having only the transmitter circuit (and not the receiver circuit) modified to accommodate this frame delimiter are compatible with conventional HDLC operation. For example, an unmodified receiver receiving the above exemplified multi-symbol construct S simply detects a frame delimiter F twice within the decoding process of the multi-symbol construct. As will be discussed in connection with FIG. 4, the receiver circuit can be modified so as to be compatible with a conventional HDLC-type transmitter circuit.

Figure 2:
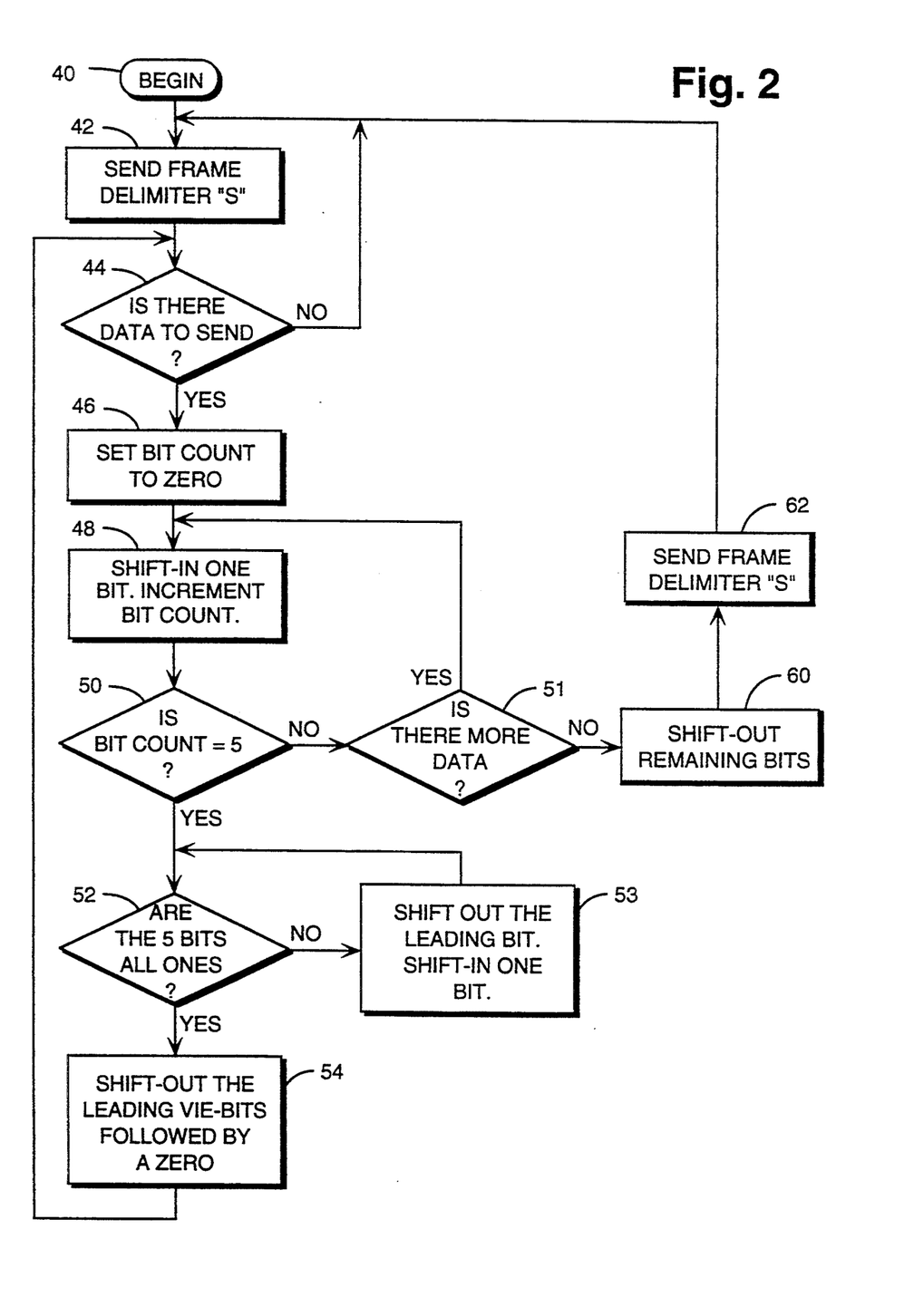
FIG. 2 is a flow chart showing how a transmitter, as shown in FIG. 1, may be implemented in accordance with the present invention.
Figure 3:
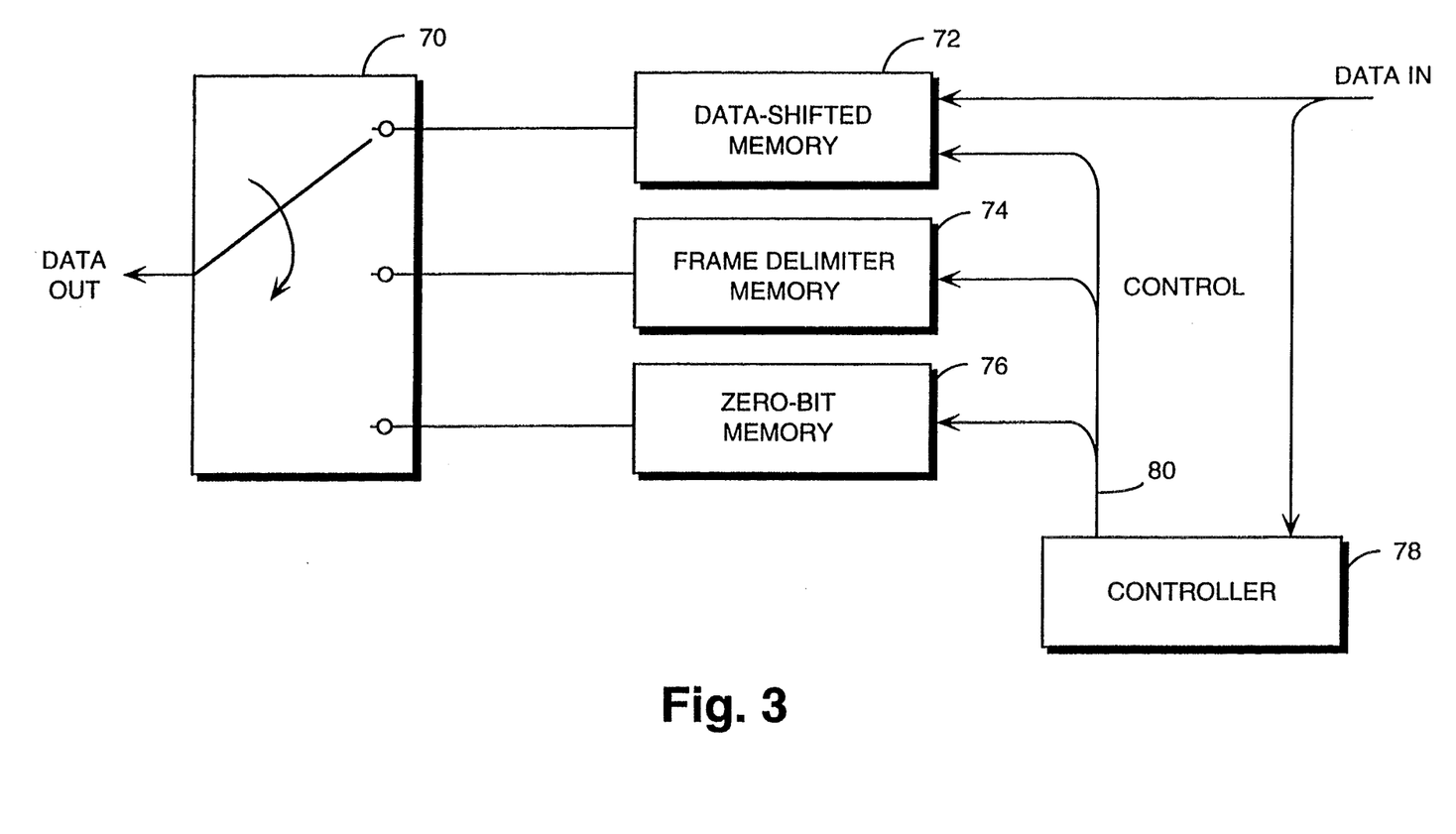
FIG. 3 is a diagram illustrating how shift registers, used in connection with the transmitter referred to with FIG. 2, may be implemented according to the present invention.

Referring now to FIG. 2, a flow chart shows how the transmitter circuits of FIG. 1 may be implemented in accordance with the above-described embodiment of the present invention. Each of the transmitter circuits in FIG. 1 includes data control circuitry, which may be implemented using conventional digital circuitry with or without a microcomputer as shown in FIG. 3.

Once the flow chart of FIG. 2 is entered (block 40), substantive execution begins by immediately sending the strong frame delimiter —F A7 A7 F—, depicted as "S" at block 42. At block 44 the transmitter circuit determines whether or not there is data to follow the frame delimiter. As long as there is no data to send, flow returns to block 42 and the transmitter circuit continuously sends the frame delimiter S. Alternatively, the transmitter circuit could send an idle string sequence during this period of inactivity.

From block 44, if the transmitter circuit determines that there is data to follow the frame delimiter, flow proceeds to block 46 where a bit counter is initialized to zero. This bit counter is used to ensure that the five-bit run-length maximum is not exceeded. At block 48, the first data bit is shifted from the communication memory in preparation for transmission over the communication path, and the bit counter is incremented.

At block 50, the transmitter circuit checks if five bits have been shifted in from the communication memory. If five bits have not been shifted in from communication memory, then flow proceeds to block 51, where the transmitter circuit determines if there is any more data intended to be sent out over the data communication path. If there is additional data to be sent out, flow returns to block 50, where the next data bit is shifted from the communication memory, and the bit counter is again incremented. This loop continues until the first five bits are shifted into the transmitter circuit, at which time the path from block 50 leads to block 52.

At block 52, a test is performed to determine if the five bits shifted into the transmitter circuit are all ones (—11111—). If this is not the case, flow proceeds to block 53, where the first of the five bits is shifted out to the communication path and the next bit is shifted into the transmitter circuit. From block 53 flow returns to block 52 to determine, with this next bit shifted into the transmitter circuit, whether or not this next set of five bits comprises all ones. From block 52, flow proceeds to block 54 when each of the five collected bits is a one.

At block 54, each of the five (leading) bits is shifted out to the communication path, and the transmitter circuit stuffs a zero bit at the end of this transmitted data. This limits the run length of ones in the data stream and ensures that the data is not perceived as a control symbol, as previously discussed in connection with conventional HDLC systems. From block 54, flow returns to block 44, for processing any further data to be transmitted onto the communication path.

Referring back to blocks 50 and 51, flow proceeds from block 50 to block 51 and then to block 60 when fewer than five bits have been shifted into the transmitter circuit and there is no more data to send out onto the communication path. Thus, at block 60 the remaining bits (the set less than five) are shifted out, followed by a multi-symbol frame delimiter (block 62) to indicate "end-of-data." From block 62, flow returns to block 42 where another multi-symbol frame delimiter is sent to delimit the next block of data.

FIG. 3 illustrates an exemplary diagrammatic embodiment of the transmitter circuit of FIG. 1, which one having ordinary skill in the art will recognize can be implemented using conventional digital circuitry, for use in connection with the flow chart of FIG. 2. The circuit of FIG. 3 includes a framing/bit-stuffing circuit 70 for feeding data from either a data-shifted memory 72, a frame-delimiter memory 74 or a zero-bit memory 76. These memories 72, 74 and 76 are used to send data out onto the data communication path (10 or 12 of FIG. 1), as described in connection with FIG. 2. The data-shifted memory 72 is used as described for block 53, the second part of block 54, and block 60 of FIG. 2. The frame-delimiter memory 74 is used as described for blocks 42 and 62, and the zero-bit memory 76 is used as described for the first part of block 54. A controller, e.g., a microcomputer, responds to data received ("data in") from the communication memory by sending the appropriate control signals, via control bus 80, to the framing/bit-stuffing circuit 70 and the memories 72, 74 and 76. One skilled in the art will recognize that the circuit of FIG. 3 is readily implemented using conventional digital logic, and/or a microcomputer having internal or external memory.

Figure 4:
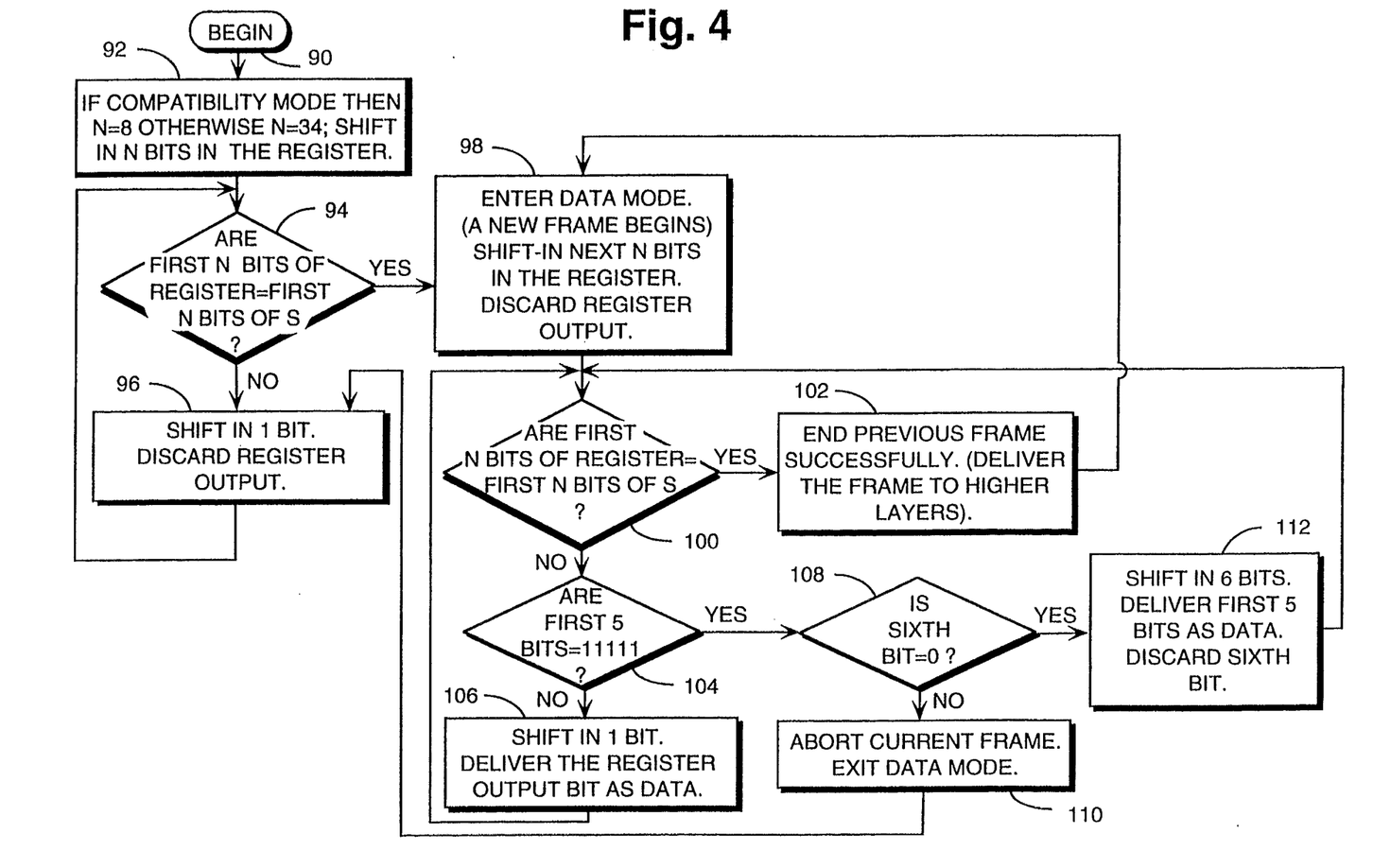
FIG. 4 is a flow chart showing how a receiver, as shown in FIG. 1, may be implemented in accordance with the present invention.

FIG. 4 is the counterpart flow chart for the transmitter circuit flow chart of FIG. 2. Thus, the flow chart of FIG. 4 illustrates how the receiver circuit of FIG. 1 may be implemented in accordance with the present invention. Once the flow chart is entered (block 90), substantive execution begins by immediately shifting n bits from the data communication path into the receiver bit-register, as depicted at block 92. The variable n is set equal to the length of the frame delimiter. With strong framing, n is set to 34. However, in compatibility mode, which is explained later, n is set to 8. At block 94, the receiver circuit determines whether or not the first n bits of the bit-register match the first n bits of the above-described multi-symbol construct, abbreviated as "S" in FIG. 4. If the bits in the bit-register does not match those in the multi-symbol construct, then flow proceeds to block 96, where the leading bit within the bit-register is discarded and another bit from the communication path is shifted into the tail end of the bit-register. From block 96, flow returns to block 94, where the comparison is repeated for this next set of n bits received from the communication path. This process of shifting one bit at a time into the bit-register continues until a match to the n bits of the multi-symbol construct is made.

Once the receiver circuit determines that it has a match, flow proceeds from block 94 to block 98 where the receiver circuit enters the data mode. Entering the data mode means that the receiver circuit has identified, via block 94, that a new frame is being received. Thus, the receiver circuit discards the present contents of the bit-register and shifts in the next n bits of data from the communication path.

From block 98, flow proceeds to block 100 to determine if the bits just shifted into the bit-register match the first n bits of the multi-symbol construct "S," which is the frame delimiter indicating that the frame has ended. If the bits just shifted into the bit-register represent "S," flow proceeds to block 102 because the receiver circuit has determined that the data mode has ended successfully. Thus, at block 102 the receiver circuit delivers the previously received data frame for further processing. From block 102, flow returns to block 98 to determine if a new data frame is being defined.

At block 100, if the bits just shifted into the bit-register do not match the first n bits of the multi-symbol construct "S," flow proceeds to block 104 where the receiver circuit determines if bit "destuffing" is required. As previously discussed, bit stuffing involves identifying a series of five contiguous ones and inserting a trailing zero so as not to confuse data with the control symbols, and bit destuffing involves identifying the five contiguous ones and removing the inserted trailing zero. For the present invention, because the above-described multi-symbol construct incorporates the conventional HDLC frame delimiter, the same stuffing and destuffing steps are performed. Thus, from block 104, flow proceeds to block 106 if the receiver circuit determines that the received data does not require bit destuffing. At block 106, the receiver circuit delivers the leading bit from the bit-register as data and shifts into the bit-register the next bit of data from the communication path. From block 106, flow returns to block 100 to evaluate this next set of n bits in the bit-register.

From block 104, flow proceeds to block 108 if the receiver circuit determines that the received data requires bit destuffing. At block 108, the receiver circuit determines if the sixth bit is truly a stuffed zero bit. If the sixth bit is not a stuffed zero bit, then an uncorrected error has occurred at this point in the serial bit stream, and flow proceeds to block 110, where the current frame is aborted and the data mode is exited. From block 110, flow proceeds to block 96, where the receiver circuit once again begins searching for the multi-symbol construct in the bit-register.

In an alternative embodiment of the receiver circuit, the receiver is run in a compatibility mode that accepts data generated by a conventional HDLC transmitter. In the compatibility mode, the operation of the receiver is identical to that described earlier except that the variable n is set to 8. Since the first 8 bits of the multi-symbol construct S are 01111110 which correspond to the conventional frame delimiter symbol F, matching the first n bits is equivalent to looking for a conventional frame delimiter. The primary advantage of this embodiment is that the receiver circuit, in accordance with the present invention, can be used to receive conventionally-framed HDLC data, for example, from transmitters which are not yet upgraded with the concepts embodied by the present invention. Because the integrity of the received data is undermined by the receiver circuit assuming that the sixth bit is not an error, it is preferred that this alternative embodiment of the receiver circuit be temporary and that the embodiment illustrated in FIG. 4 be used for long-term implementations.

Note that the transmitter does not require any change in operation since the frames delimited by the new strong frame delimiter S are accepted as well formed by the conventional receivers since the F-$A_7$-$A_7$-F-data-F-$A_7$-$A_7$-F sequence is interpreted as a flag-abort-abort-flag-data-flag-abort-abort-flag sequence. Upon receiving the first F, a conventional receiver prepares to receive a data packet but aborts the operation upon receiving $A_7$ which is the abort symbol for conventional HDLC. Upon receiving the second $A_7$, it aborts again. Upon receiving the second F, the receiver again prepares to receive the data packet and receives the data. Upon receiving the third F, it considers the packet as valid and delivers the data to the microcomputer. Subsequent aborts and flag do not affect the data that has already been delivered and do not result in any loss of data.

From block 108, flow proceeds to block 112 when the receiver circuit determines that the sixth bit is truly a stuffed zero bit. At block 112, the receiver circuit delivers these first five (leading) bits as data, discards (or removes) the appended stuffed zero bit, and shifts into the bit-register the next six bits from the communication path. From block 112, flow proceeds to block 100 to evaluate the next set of thirty-four bits in the bit register.

Figure 5:
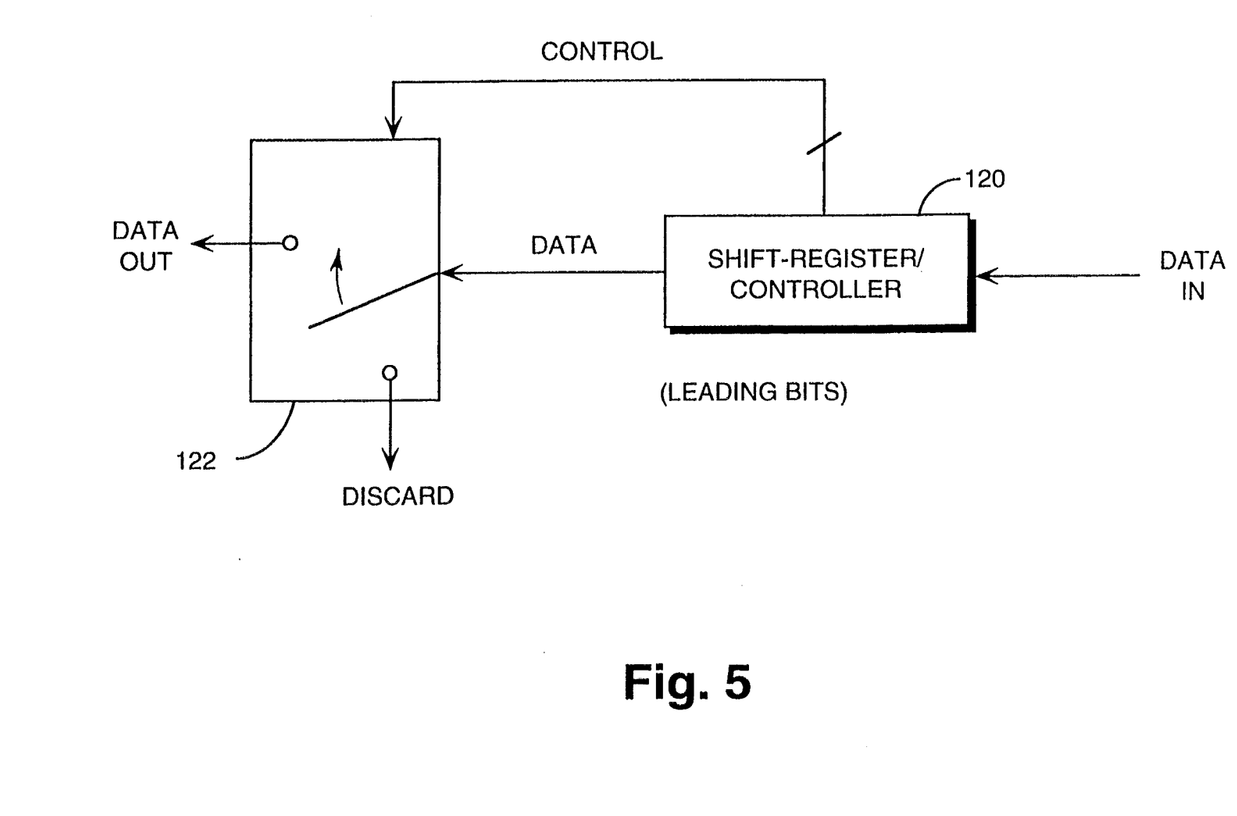
FIG. 5 is a diagram illustrating how the receiver referred to in FIG. 4, may be implemented according to the present invention.

Turning now to FIG. 5, the receiver circuit is illustrated in block diagram form. This circuit includes a combination bit-register/controller 120 and a deframing/bit-unstuffing circuit 122, which may also be implemented using conventional digital circuitry. The bit-register/controller 120 includes at least thirty-four bits for the comparisons discussed in connection with blocks 94 and 100 of FIG. 4. Data is shifted into the bit-register portion of the bit-register/controller 120 from the data communication path, and processed by the controller portion of the bit-register/controller 120 as described in connection with FIG. 4. The controller portion of the bit-register/controller 120 includes control leads ("CONTROL") for operating the deframing/bit-unstuffing circuit 122 so that it discards the stuffed zero bit and other unwanted bits as described, for example, in connection with blocks 96, 98 and 112 of FIG. 4.

Accordingly, the present invention provides an extremely reliable bit-oriented data link protocol for high-integrity transmission of data in high-speed wide-area networks. The protocol is compatible, in either the transmit or receive direction, with conventional HDLC systems as defined, for example, in ISO Standard 3309. The concepts embodied in the present invention may be used with other run-length protocol schemes as well.

While the inventive system has been particularly shown and described with reference to various embodiments and block diagrams, it will be recognized by those skilled in the art that the diagrams and illustrations are intended to teach those skilled in the art how to implement the preferred embodiment(s) of the present invention. It will be understood by those skilled in the art that modifications, changes and embellishments may be made to the present invention described above without departing from the spirit and scope thereof, which is defined by the claims that follow.

What is claimed is:

1. A strong framing method for transmitting data packets which are transmitted as bit sequences from a data-transmitting device to a data-receiving device in a run-length code type data communication scheme, including frame delimiter strings, abort strings and idle strings as control symbols which are part of the data communication scheme, the method comprising:

providing the frame delimiter string as a multi-symbol construct for delimiting said transmitted data bit packets, the multi-symbol construct includes a plurality of separately-identifiable individual control symbols each of the individual symbols including at least eight-bits;

providing the abort strings as having minimum run lengths which are longer than the individual symbols in the multi-symbol construct;

providing the idle strings as having minimum run lengths which are longer than the length of the abort string;

transmitting informational data with the control symbol data as a bit sequence from the data-transmitting device;

receiving the transmitted data at the data-receiving device; and analyzing the received data to detect the presence of bit errors.

2. A method, according to claim 1, wherein said step of analyzing further includes recognizing shared data bits between adjacent control symbols as errors.

3. A method, according to claim 1, wherein the step of providing the frame delimiter string includes detecting data in an HDLC frame delimiter string.

4. A method, according to claim 3, further including converting the received data to an HDLC format.

5. A method, according to claim 1, wherein the multi-symbol construct is selected so as to provide a Hamming Distance equal to at least four.

6. A method, according to claim 1, wherein the idle string is longer than the frame delimiter string.

7. A method for transmitting data packets as bit sequences from a data-transmitting device to a data-receiving device in a run-length code type data communication scheme, includes frame delimiter strings, abort strings and idle strings which are transmitted as control symbols as part of the data communication scheme, the method comprising:

providing the frame delimiter string as a multi-symbol construct for delimiting the transmitted data, the multi-symbol construct including at least four separately-identifiable individual symbols, each of the symbol having at least eight-bits;

providing the abort string which has a minimum run length which is substantially longer than the individual symbols in the multi-symbol construct;

providing the idle string which has a minimum run length which is longer than the run length of the frame delimiter string; and transmitting informational data with control symbols as a bit sequence from the data-transmitting device.

8. A method for transmitting data packets, according to claim 7, further including converting data from an HDLC format.

9. A method for transmitting data packets, according to claim 7, wherein the multi-symbol construct is selected so as to provide a Hamming Distance equal to at least four.

10. A method for transmitting data packets, according to claim 7, wherein the frame delimiter string is about thirty-four bits in length.

11. A method for transmitting data packets, according to claim 10, wherein the idle string is about thirty-five bits in length.

12. A method for transmitting data packets, according to claim 10, wherein the abort string is about fourteen bits in length.

13. A framing protocol arrangement for transmitting data packets as bit sequences from a data-transmitting device in a run-length code type data communication scheme, including frame delimiter strings, abort strings and idle strings are transmitted as control symbols, the framing protocol arrangement comprising:

means for providing the frame delimiter string as a multi-symbol construct for delimiting the transmitted data, the multi-symbol construct including a plurality of separately-identifiable individual symbols having at least eight-bits;

means for providing the abort strings to include minimum run lengths which are longer than the run length of individual symbols in the multi-symbol construct;

means for providing the idle strings to include minimum run lengths which are longer than the length of the multi-symbol construct;

a data-transmitting device which transmits data including the control symbols, as bit sequences; and a data-receiving device which receives the transmitted data and detect any shared zero bits between adjacent control symbols as errors.

14. A framing protocol arrangement, according to claim 13, further including means for generating an idle string to indicate an inactive condition.

15. A framing protocol arrangement, according to claim 14, wherein the frame delimiter string is transmitted during periods of data transmission inactivity.

16. A framing protocol arrangement, according to claim 13, wherein the frame delimiter string includes —01111110 01111110 01111110 01111110—.

17. A method for transmitting data packets as bit sequences from a data-transmitting device to a data-receiving device in a run-length code type data communication scheme, including abort strings, idle strings and frame delimiter strings used to delimit informational data transmitted in the data packets, the framing protocol arrangement comprising:

a transmitter circuit for providing the frame delimiter string as a multi-symbol construct for delimiting the transmitted data, the multi-symbol construct including at least four separately-identifiable individual symbols having at least eight-bits, wherein the abort string includes a minimum run length which is substantially longer than the individual symbols in the multi-symbol construct, and the idle string is longer than frame delimiter string;

a data-receiving circuit;

a data-transmitting device which transmits data, including the control symbols as a bit sequence from the data-transmitting device to the data-receiving device; and wherein the data-receiving device detects as errors any shared zero bits between adjacent control symbols.

* * * * *